(12) United States Patent
Petty et al.

(10) Patent No.: US 6,515,043 B2
(45) Date of Patent: Feb. 4, 2003

(54) SILICONE OLIGOMERS WITH HIGHER ALKOXY GROUPS

(75) Inventors: Herbert B. Petty, Bethel, CT (US); Robert Pickwell, Tonawanda, NY (US)

(73) Assignee: Crompton Corporation, Middlebury, CT (US)

( * ) Notice: Subject to any disclaimer, the term of this patent is extended or adjusted under 35 U.S.C. 154(b) by 17 days.

(21) Appl. No.: 09/812,920

(22) Filed: Mar. 20, 2001

(65) Prior Publication Data

US 2001/0021761 A1 Sep. 13, 2001

Related U.S. Application Data

(63) Continuation of application No. 09/314,065, filed on May 18, 1999, now Pat. No. 6,207,783, which is a continuation-in-part of application No. 09/266,500, filed on Mar. 11, 1999, now Pat. No. 6,323,277, and a continuation-in-part of application No. PCT/US99/08533, filed on Apr. 16, 1999.

(51) Int. Cl.$^7$ .......................... C08K 9/06; C08G 77/04; C08L 83/06

(52) U.S. Cl. .................. 523/212; 524/858; 524/860; 524/861; 524/862; 524/863; 524/588; 525/100; 525/101; 525/102; 525/103; 525/105; 525/106; 525/474; 525/479; 528/15; 528/18; 528/21; 528/31; 528/33; 528/35; 556/450

(58) Field of Search ............................. 528/15, 18, 24, 528/31, 33, 35; 525/100, 101, 102, 103, 105, 106, 479, 474; 524/858, 860, 861, 862, 863, 588

(56) References Cited

U.S. PATENT DOCUMENTS

| | | | | | |
|---|---|---|---|---|---|
| 4,550,056 A | * | 10/1985 | Pickwell et al. | ...... | 174/110 AR |
| 5,366,772 A | * | 11/1994 | Badesha et al. | ........... | 428/35.8 |
| 5,543,173 A | * | 8/1996 | Horn et al. | .................. | 264/109 |
| 6,258,914 B1 | * | 7/2001 | Su et al. | ..................... | 525/100 |
| 6,376,635 B1 | * | 4/2002 | Amako et al. | ................. | 528/15 |
| 6,388,042 B1 | * | 5/2002 | O'Lenick, Jr. | ............... | 528/14 |

\* cited by examiner

*Primary Examiner*—Robert Dawson
*Assistant Examiner*—Jeffrey B. Robertson
(74) *Attorney, Agent, or Firm*—Michael P. Dilworth; Paul Grandinetti

(57) ABSTRACT

An oligomer of the formula:

$$[R_3SiO_{1/2}]_m[O_{1/2}Si(R_2)O_{1/2}]_n[SiO_{3/2}R]_o[SiO_{4/2}]_p \quad (I)$$

wherein each R is selected individually from the group consisting of $R^1$, —$OR^2$ and —$OR^3$; each $R^1$ is independently a substituted or unsubstituted hydrocarbon group; each $R^2$ is a $C_1$–$C_6$ alkyl group or an acyl group; and each $R^3$ is a independently an alkyl or alkenyl group having at least 8 carbon atoms;

with the provisos that if $R^3$ is alkenyl, there is no unsaturation within two carbon atoms adjacent to the oxygen atom of the —$OR^3$ group; at least one R group is —$OR^3$; at least one quarter of all R groups are —$OR^2$ or —$OR^3$; m=2 to 20; n=0 to 50; o=0 to 20; and p=0 to 10.

The oligomer is a useful component of in insulation formulations for wire and cable used in underground locations.

18 Claims, No Drawings

SILICONE OLIGOMERS WITH HIGHER ALKOXY GROUPS

CROSS REFERENCE TO RELATED APPLICATIONS

This application is a continuation of U.S. Ser. No. 09/314,065, filed May 18, 1999, now U.S. Pat. No. 6,207,783, which is a continuation-in-part of U.S. Ser. No. 09/266,500, filed Mar. 11, 1999, now U.S. Pat. No. 6,323,277, and PCT Application No. PCT/US99/08533, filed on Apr. 16, 1999, designating the United States, all of which are incorporated by reference.

BACKGROUND OF THE INVENTION

1. Field of the Invention

This invention relates to silicone oligomers useful as coupling agents for curable compositions, for instance free-radically curable filler-organic elastomeric polymer compositions having special application as insulation coatings, to compositions employing the oligomers, and to cured products obtained therefrom.

2. Description of the Prior Art

A substantial amount of research has been performed heretofore in connection with the treatment of fillers or reinforcing agents for the purpose of improving physical or mechanical properties of plastics, resins or rubbers reinforced with the filler. Much of this research has centered on the pretreatment of glass fiber reinforcement materials for resins and rubbers. For example, U.S. Pat. No. 3,702,783 describes the application as a size to glass fibers of a blend of 3-glycidoxypropyltrimethoxysilane and methyltrimethoxysilane. U.S. Pat. No. 3,816,235 discloses a size composition for the treatment of glass fibers wherein the size composition contains a blend of aminoalkyltriethoxysilane and methyltriethoxysilane. U.S. Pat. No. 3,944,707 discloses the use as a size for glass fiber reinforcement for plastics, blends of vinyl silane or vinyl siloxanes and a beta-haloalkoxysilane. Similarly, U.S. Pat. No. 3,993,837 discloses glass fiber size compositions containing blends of epoxyalkylsilane or siloxane and a beta-haloalkoxysilane.

U.S. Pat. No. 4,049,865 discloses glass fiber size compositions containing a blend of an aminoalkylsilane and a vinyl silane. U.S. Pat. No. 4,130,677 discloses the sizing of glass bottle surfaces with an aminoalkylsilane.

Martens et al, U.S. Pat. No. 3,148,169, discloses the pretreatment of clay filler with a silicone fluid to coat the clay particles to impart a hydrophobic character to the clay and to mask the acidic nature of the clay so that peroxides later used as crosslinking agents are not deactivated.

Pickwell et al, U.S. Pat. No. 4,550,056, describes electrical cables comprising a conductor and a coating of insulation on the conductor, the coating comprising a cured composition of
(1) an organic elastomer;
(2) an inorganic filler;
(3) a coupling composition comprising (a) an ethylenically unsaturated silane, having bonded to silicon, at least one hydroxy group and/or alkoxy group; (b) a methyl ethoxy siloxane oligomer fluid; and (c) a methyl vinyl siloxane oligomer fluid.

Rykowski, U.S. Pat. No. 4,179,537, discloses blends of an organofunctional silane, e.g., vinyltrialkoxysilanes, methacryloxyalkyltrialkoxysilanes, vinyltrihalosilanes and the like with a non-organofunctional silane, e.g., alkyltrialkoxysilanes, and the incorporation of such blends into organic resins, e.g., EPDM rubber for improving the adhesion between inorganic substrates such as clay fillers and the resin. This patent fails to disclose, teach or suggest the incorporation of siloxane oligomers in the coupling composition and suggests that the presence of siloxane oligomers in the resin-filler system could have a detrimental effect on coupling efficiency (col. 4, lines 54–63).

Use of silanes having silicon-bonded 2-methoxyethoxy groups as coupling agents, e.g., vinyl-tris-(2-methoxyethoxy)silane (col. 2, lines 44–47) is also described in U.S. Pat. No. 4,179,537. Vinyl-tris-(2-methoxyethoxy) silane, has been used industrially for many years as a coupling additive in mineral-filled EPM and EPDM wire and cable insulations. EPM is an ASTM designation for copolymers of ethylene and propylene; EPDM is a terpolymer of ethylene, propylene and a diene monomer such as ethylidene norbornene or 1,4 hexadiene. Vinyl-tris-(2-methoxyethoxy) silane has been extensively used heretofore because it provides a unique balance of elastomer reinforcement and the degree of wet electrical stability required. However, it releases 2-methoxyethanol as a hydrolysis by-product when it is used and, unfortunately, 2-methoxyethanol is now being studied as a suspected teratogen. Consequently, coupling agent products based on vinyl-tris-(2-methoxyethoxy)silane are now facing continuing replacement pressure in the marketplace.

Commercial products used as coupling agents in elastomer/filler compositions include cohydrolysis products of dimethyl and vinylmethylchlorosilanes which are used as a filler hydrophobe treatment on calcined clays. Such products however, have a relatively high cost due to the high cost of vinylmethyldichlorosilane. Reducing the vinylmethyldichlorosilane content thereof gives inferior performance in wire cable insulation applications.

U.S. Pat. No. 4,950,779, Wengrovius, et al. (General Electric), describes mixtures comprising cyclic, linear and branched alkoxy functional silicone oligomers produced by condensation of organotrialkoxysilanes, such as methyltrimethoxysilane and vinyltrimethoxysilane, using formic acid, optionally with a strong acid catalyst.

U.S. Pat. No. 5,298,998, Horn, et al. (Hüls), describes mixtures of linear and cyclic alkoxy functional silicone oligomers produced from vinyltrialkoxysilanes using hydrogen chloride catalyst and water.

U.S. Pat. No. 5,210,168, Bergstrom, et al. (Dow Corning), describes alkoxy functional silicone oligomer mixtures produced from organotrialkoxysilanes using a carboxylic acid, such as formic acid, and a strong acid catalyst.

In U.S. Pat. No. 6,140,445, incorporated herein by reference, there are described novel alkoxy functional silicone oligomers having alkoxysilylalkyl substituents on a backbone silicon atom. Such oligomers may be produced from vinylalkoxysiloxane oligomers by hydrosilation with an alkoxyhydridosilane; by hydrosilating a vinylalkoxysilane with a hydridoalkoxy silicone oligomer; or by condensation of a bis-alkoxysilane having silicon atoms joined by other than an Si-O bond, optionally with other alkoxysilanes. Such oligomers are disclosed to be useful as coatings or adhesives, or additives therefor.

SUMMARY OF THE INVENTION

The invention is an oligomer of the formula:

$$[R_3SiO_{1/2}]_m[O_{1/2}SiR_2O_{1/2}]_n[SiO_{3/2}R]_o[SiO_{4/2}]_p \qquad (I)$$

wherein
each R is selected individually from the group consisting of $R^1$, $-OR^2$ and $-OR^3$; each $R^1$ is independently a substituted or unsubstituted hydrocarbon group; each $R^2$ is a $C_1$–$C_6$ alkyl group or an acyl group; and each $R^3$ is independently an alkyl or alkenyl group having at least 8 carbon atoms;

with the provisos that if $R^3$ is alkenyl, there is no unsaturation within two carbon atoms adjacent to the oxygen atom of the —$OR^3$ group; at least one R group is —$OR^3$; at least one quarter of all R groups are —$OR^2$ or —$OR^3$; m=2 to 20; n=0 to 50; o=0 to 20; and p=0 to 10.

Silicone oligomers having thereon at least one $C_8$ or higher alkoxy or alkenoxy group, preferably $C_{10}$–$C_{16}$ alkoxy or alkenoxy, especially dodecyloxy, have been found to hydrolyze extremely slowly. Transesterification of relatively inexpensive siliconate oligomers provides a cost effective method of providing stable silicone oligomers with lipophilic hydrocarbon functionality. While there may be some hydrolysis of the —$OR^3$ groups of the oligomer over extended time periods, it does not substantially modify the overall polymer properties. Moreover, at least in the case of dodecyloxy functional oligomers, a trace level release of dodecanol can be advantageous for underground applications, such as in insulation formulations for buried cables. Dodecanol is reported as a treeing retardant in electrical insulation.

DETAILED DESCRIPTION OF THE INVENTION

In the formula (I), above, $R^1$ is independently a substituted or unsubstituted hydrocarbon group. For instance $R^1$ may be a saturated or unsaturated aliphatic or aromatic hydrocarbon of 1 to 16 carbon atoms, e.g., alkyl (linear or branched), or cycloalkyl. Exemplary unsubstituted $R^1$ groups are methyl, ethyl, 1i-propyl, 1-butyl, t-butyl, pentyl, cyclohexyl, octyl, decyl, dodecyl, phenyl, benzyl or napthyl. Methyl, ethyl and phenyl are preferred $R^1$ groups which are unsubstituted hydrocarbon groups.

The $R^1$ groups also may contain ethylenic or acetylenic unsaturation.

Examples of such $R^1$ groups include vinyl, allyl, propargyl, acryloxyalkyl, methacryloxyalkyl, crotyloxyalkyl, styryl, n-octenyl, linolyl, lineoyl, etc. Vinyl, acryloxypropyl and methacryloxypropyl are preferred.

Other $R^1$ groups may be monovalent organic radicals linked to the Si atom of the siloxane oligomer backbone by an Si—C bond, and which has one or more, ether, ester, carbamate, isocyanurate, thioether, polysulfide, blocked mercaptan, amide, cyano, epoxy or oximato group thereon.

Exemplary ether-containing groups include alkoxyethyl or alkoxypropyl and polyether groups, especially those obtained as a result of hydrosilation of an allyl-started poly(ethylene oxide), allyl-started polypropylene oxide or allyl-started EO/PO copolymer. Ether groups may also be provided by etherification of silylalkylhydroxides.

Exemplary ester containing groups are acetic acid, propionic acid, octanoic acid, benzoic acid, fatty acid, or acid terminated polyester, esters of hydroxyalkyl groups, for instance acetyloxypropyl, propionyloxypropyl, benzoyloxyethyl, and the like.

Exemplary carbamate containing groups may be groups obtained by reaction of silylalkylisocyanates with alcohols, and may include polyurethane as well an mono-carbamato structures. Specific such groups include propyl-N-carbamatoethyl; propyl-N-carbamatomethyl, ethyl-N-carbamatoethyl and propyl-N-carbamatoisopropyl.

Exemplary amide containing groups are suitably derived from aminoalkyl groups, amidized with a carboxylate ester such as methyl acetate, methyl propionate or a fatty acid ester, and the like. Specific such groups include 3-acetamidopropyl, 2-propionamidoethyl, 3-cocoamidopropyl.

Polysulfide encompasses groups having the functionality —$S_n$— therein where n is 2–8, preferably 2–4, especially disulfide and tetrasulfide. Specific such groups include: $C_4H_9$—SS—$C_3H_6$— and $C_2H_5$—SS—$C_2H_4$—.

Blocked mercaptans are functional groups produced by reaction of a mercapto group with a subsequently removable blocking agent. Exemplary blocked mercaptan groups include thioester and other groups disclosed in copending application PCT/US98/17391, filed Aug. 21, 1998, designating US.

Representative examples of silanes which may be incorporated into the oligomers to provide blocked mercaptan groups include 3-methyldiethoxysilylpropyl thioacetate, 3-trimethoxysilylpropyl thioacetate, 3-triethoxysilylpropyl thioacetate, 3-trimethoxysilylpropyl thiopropionate, 3-triethoxysilylpropyl thiobenzoate; 3-triethoxysilylethyl thioacetate, 3-triethoxysilylmethyl thioacetate, 3-triethoxysilylpropyl thiooctanoate, and other compounds listed in PCT/US98/17391, filed Aug. 21, 1998.

Cyano containing groups are exemplified by 3-cyanopropyl.

Epoxy-containing groups are exemplified by glycidoxypropyl and β-(3,4-epoxycyclohexyl)ethyl.

The $R^1$ groups may also be substituted by a silyl group. For instance, $R^1$ may be a group, —A—W, which comprises a silyl group W and a divalent linking group A which is attached by an Si—C bonds to group W and to a silicon atom of the siloxane oligomer. Preferably such a group is internal (i.e. non-terminal) to the oligomer. The divalent linking group A creates a non-siloxane bridge between the siloxane oligomer and the silyl group W. The linking group A may contain hetero atoms in the structure so long as Si—C bonds are used at the ends of the linking group to form the respective connections the oligomer and to the silyl group W. The linking group may be linear, branched or cyclic and may be olefinically or aromatically unsaturated. The linking group may be, for instance, alkylene, alkarylalkylene or alkarylene, or it may be alkylene which is interrupted by hetero-atom containing organic structures such as ether, including polyether; ester, including polyester; carbamate, including polyurethane; isocyanurate; thioether; polysulfide, including disulfide and tetrasulfide; or the like. Preferably the linking group is an alkylene of 2 to 12 carbon atoms. The linking group A may be substituted with silyl or siloxy functions, as well as unsaturated groups. Indeed, group A may form part of a backbone with relatively linear siloxane chains attached to either end of the group. Examples of linking groups A include cycloaliphatic groups such as 1,4-diethylenecyclohexylene:

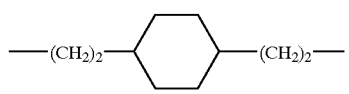

or 1,3,-diethylene-5-triethoxysilylethylcyclohexylene:

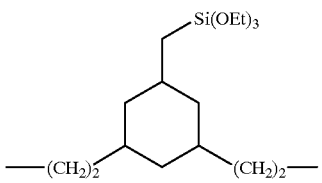

branched or linear aliphatic groups such as ethylene, 1,2-propylene, 1,3-propylene, 1,4-butylene, 1,3-butylene, 1,2-butylene or 2,2-dimethyl-1,3-propylene; arylene groups such as 1,4-phenylene; alkarylalkylene groups such as 1,4-diethylenephenylene:

divalent polyether groups of the formula:

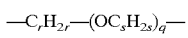

where q is 1–50, preferably 1–5; r and s are integers of 2–6; and divalent thioether or polysulfide-containing groups of the formula:

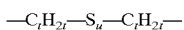

where t is 2–16, preferably 2–4, and u is 1–8, preferably 2–4. Preferably the linking group is an alkylene of 2 to 12 carbon atoms, more preferably 2–3 carbon atoms.

The silyl functional group W in the structure —AW may be a silyl group having hydrolyzable functionality, such as alkoxy or acetoxy functionality. Alternatively, the group W may be a silicon linked organosiloxane or polyorganosiloxane group. Preferably, the silyl group W is an alkoxysilyl group or a further siloxane oligomer of alkoxy silane monomers, more preferably a dialkoxysilyl and most preferably a trialkoxysilyl group.

A preferred group —A—W may be represented as —$C_fH_{2f}$—$SiR^1_g(X)_{3-g}$ wherein the structure —$C_fH_{2f}$— corresponds to A and the structure —$SiR^2_g(X)_{3-g}$ corresponds to W. Suitably, f=2 to 12, g=0 to 2, X is a hydrolyzable group such as halogen, oxime, alkoxy, aryloxy, alkenoxy or acetoxy and $R^1$ is as previously defined. More preferably f=2 to 6, g=0–1, X is methoxy, ethoxy or acetoxy, and $R^1$ is methyl. Exemplary such groups are —$C_2H_4Si(OCH_3)_3$; —$C_2H_4Si(OC_2H_5)_3$; —$C_2H_4Si(OCH_3)_2(CH_3)$; —$C_2H_4Si(OCH_3)_2Cl$; —$C_2H_4(C_6H_9)(C_2H_4Si(OCH_3)_3)_2$; —$C_2H_4(C_5H_8)C_2H_4Si(OC_2H_5)_3$; and —$C_2H_4Si(OCH_3)_2(OSi(OCH_3)_3)$.

$R^2$ is a $C_1$–$C_6$ alkyl group or an acyl group. Exemplary $R^2$ groups are methyl, ethyl, 1i-propyl, n-propyl, 1-butyl, t-butyl, pentyl, cyclohexyl, octyl, acetyl, benzoyl and propionyl. Preferably $R^2$ is lower alkyl ($C_1$–$C_6$), more preferably methyl or ethyl.

$R^3$ is a $C_8$ or higher alkyl or alkenyl group. Examples include octyl, nonyl, decyl, dodecyl and alkyl groups derived from fatty acids, which may be saturated or unsaturated, for instance myristyl, palmityl, stearyl, palmitoleyl, oleyl, linoleyl, and mixtures such as coco alkyl, tallow alkyl, etc. Preferred $R^3$ groups are $C_{10}$–$C_{16}$ saturated hydrocarbon groups, especially dodecyl.

Preferably m+n+o+p<50, more preferably ≦45, even more preferably <30 and most preferably <15. In its broadest aspect, m=2 to 20, n=0 to 50, o=0 to 20 and p=0 to 10. Preferably, m=2 to 10, n=0 to 20, o=0 to 20 and p=0 to 10. More preferably m=2 to 10, n=0 to 20, o=0 to 10 and p=0 to 5. Even more preferably m is 2 to 4, n is to 1 to 15, o is 0 to 2 and p is 0 to 1, though it is understood there may be distributions of the number of siloxy units within a given oligomer batch. This preference will also depend on the oligomer structure itself. It should also be noted from the foregoing that while linear structures are among the even more preferred structures, linearity is not necessary. The preferred, more preferred and even more preferred structures may also include branched structures.

Preferably there are multiple —$OR^2$ groups available on the oligomer so that upon curing these oligomers may cross-link with each other and/or the inorganic filler, if present. Thus, R is —$OR^2$, more preferably ethoxy or methoxy, in at least one quarter of the R groups, while the remainder of the R groups are $R^1$ or —$OR^3$ groups. More preferably at least half of the R groups are —$OR^2$ or —$OR^3$ groups. Also preferably, with respect to the individual M (terminal) or D (linear) units of the oligomer, if one R is $R^1$ it is preferred that the other R group or groups on such unit are —$OR^2$ and/or —$OR^3$.

It is preferred that the oligomer has a viscosity of 0.5 to 500 csks or more preferably 0.5 to 200 csks (25° C.). As is clear to one of skill in the art, the viscosity of the oligomer may be adjusted by adjusting the number of siloxy groups in the oligomer. In most applications the viscosity will be adjusted for a specific application to ensure that the composition containing the oligomer will spread over a specific substrate or be sprayable.

Oligomer Manufacture

The oligomers may be formed by condensation reactions of one or more silane compounds having an average of 2 or more —$OR^2$ groups per molecule, in a manner such that at least one —$OR^2$ group remains on the oligomer, and then fully or partially transesterifying the oligomer —$OR^2$ groups with a $C_8$ or higher alcohol. The individual silane compounds used to prepare the oligomers have at least one alkoxy group or acyloxy group, but preferably are di- or tri-alkoxy silanes.

The condensation may be performed according to any of the procedures disclosed in the previously identified patents, U.S. Pat. No. 4,950,779, Wengrovius, et al., U.S. Pat. No. 5,298,998, Horn, et al., U.S. Pat. No. 5,210,168, Bergstrom, et al., and in U.S. Pat. No. 6,323,277 and WO Application No. PCT/US99/08533, all of which documents are incorporated herein by reference.

Representative examples of alkoxysilanes which may be used in the condensation reaction include: vinyltrimethoxysilane, vinylmethyldimethoxysilane, vinyldimethylmethoxysilane, vinyltriethoxysilane, vinyltriisopropenoxysilane, methacryloxypropyltriethoxysilane, methacryloxypropyltrimethoxysilane, acryloxypropyltrimethoxysilane, acryloxypropyltriethoxysilane, acryloxyethyltrimethoxysilane, trimethoxysilylpropyl methyl maleate, styryloxypropyltriethoxysilane, allyltrimethoxysilane, allyloxypropyltriethoxysilane, allyl-N-(3-trimethoxysilylpropyl)carbamate, methacrylamidopropyltriethoxysilane, methacryloxypropyleneoxypropylmethyldimethoxysilane, crotyloxypropyltrimethoxysilane, 1,4-bis-(triethoxysilylethyl)cyclohexane; 1,3,5-tris-(triethoxysilylethyl)cyclohexane; bis-(triethoxysilylethyl)benzene; tris-triethoxysilylethyl isocyanurate, 1,4-bis- (triethoxysilyl)butane, phenyltrimethoxysilane, phenylmethyldimethoxysilane, napthyltrimethoxysilane, cyanopropyltriethoxysilane, glycidoxypropyltriethoxysilane, beta-(3,4-epoxycyclohexyl)trimethoxysilane, (polyethyleneoxy) propyltrimethoxysilane, (poly(ethyleneoxy)(propyleneoxy)) propyltriethoxysilane, 3-trimethoxysilylpropyl acetate, 3-methyldiethoxysilylpropyl acetate, phenyl N-(3-trimethoxysilylpropyl)carbamate, 3-triethoxysilylpropyl N-phenylcarbamate, methyl N-(3-trimethoxysilylpropyl) carbamate, 3-methyldiethoxysilylpropyl thioacetate, 3-trimethoxysilylpropyl thioacetate, 3-triethoxysilylpropyl thioacetate, 3-trimethoxysilylpropyl thiopropionate, 3-triethoxysilylpropyl thiobenzoate; 3-triethoxysilylethyl thioacetate, 3-triethoxysilylmethyl thioacetate, 3-triethoxysilylpropyl thiooctanoate, and the like. Corresponding compounds in which silylalkoxy groups are replaced by silyloxyacetyl groups may also be used.

Moreover, in the condensation, dialkoxysiloxy units may be inserted into the oligomer to affect the cross-linking, surface active and viscoelastic properties of the oligomer. This may be done by using tetraalkoxysilanes, such as tetramethoxysilane or tetraethoxysilane.

The condensation of the alkoxy silane monomers is suitably performed in the presence of a carboxylic acid (e.g., acetic or formic acid) or water. Alternatively, a strong condensation catalyst may be used, e.g., a strong acid or an acidic ion exchange resin such as AMBERLYST resin from Rohm & Haas Co. The other reaction conditions of the condensation will depend on the monomeric silanes; however, temperature ordinarily will be in the range of 20 to 60° C.

The oligomers of the invention are useful as crosslinkers, coupling agents, adhesion promoters, as intermediates for the preparation of other oligomers and as filler treating agents. Illustrative compositions into which the oligomers may be incorporated include curable polymer/filler compositions used for wire and cable insulation and the like; silicate hard coats; adhesion promoting primers for paints or adhesives; masonry sealants; UV or EB cured acrylic coatings; (meth)acrylate ester based adhesives and sealants, such as anaerobic adhesives and polymer-in-monomer syrup adhesives; polyester resin systems used to form reinforced composites with fiberglass, carbon or kevlar reinforcements; and RTV silicones.

The oligomers may also be converted to hydrolyzates, in which the OR$^2$ groups are replaced by OH, and used in that form in aqueous dispersions, as adhesion promoting or sealing primers, as additives to polymer emulsions, as filler treating agents and in curable silicone formulations.

Curable Polymer/Filler Compositions

Curable polymer/filler compositions of the present invention may comprise: (1) a free-radically curable organic polymer, (2) an inorganic filler and (3) an oligomer of the invention. The composition may also include a free-radical catalyst or generator. Typical organic polymers to which the present invention applies are curable elastomers such as any of the synthetic or natural rubbers with which fillers are conventionally employed. Examples include natural rubber, synthetic rubbers such as styrene-butadiene rubber, ethylene-propylene copolymers, polyethylene, ethylene-vinyl acetate copolymers, ethylene-propylene terpolymer rubbers in which the third monomeric component is ethylidene norbornene or 1,4-hexadiene, urethane rubbers, polyisobutadiene rubbers, and any other vulcanizable or crosslinkable elastomeric material.

The inorganic fillers which may be used in the curable compositions are known to those skilled in the art and include any suitable finely divided or particulate inorganic substance. At the time of incorporation into the curable composition most fillers may be in the form of finely divided particles. They may be approximately isometric, having a maximum diameter, i.e., a maximum linear dimension of ten $\mu$m, preferably five $\mu$m; or they may be in the form of plates or needles (fibers) having a thickness or diameter of twenty pm or less, preferably five pm or less. Compositions containing larger particles may be usefully formulated, but they tend to give poor properties. The minimum size of the filler particles is not critical, any of the conventionally used fillers being suitable in this respect. Among the specific fillers which may be used in the present invention are asbestos, ground glass, kaolin and other clay minerals, silica, calcium silicate, calcium carbonate (whiting), magnesium oxide, barium carbonate, barium sulfate (barytes), metal fibers and powders, glass fibers, refractory fibers, titanium dioxide, mica, talc, chopped glass, alumina, aluminatrihydrate, quartz, wollastonite (calcium silicate), and inorganic coloring pigments. Kaolin clay is a filler of choice in the wire and cable industry and therefore is preferred.

A heat activated free-radical catalyst or generator will typically be incorporated into the curable compositions of the invention. However, in some cases such a catalyst may not be required, for instance when the oligomer contains disulfide or polysulfide groups, or when other sources of free radicals are used such as UV radiation. When a free-radical catalyst is employed it may be any known catalyst or vulcanizing agent compound, of which organic peroxides, azonitrile compounds (e.g. AIBN) and sulfur are examples. Metal drier compounds, such as fatty acid, octoate or naphthoate salts of zinc, calcium, cobalt, copper, molybdenum, manganese, chromium or nickel, may also be used as cure catalysts. Preferred catalysts are organic peroxides. Any of the peroxides described or listed in Martens' U.S. Pat. No. 3,148,169 can be employed. The catalyst is one which is heat activated so that when a mixture of the organic elastomer and catalyst is heated to a given temperature or temperature range the crosslinking reaction takes place.

Any other additives conventionally employed in free-radically curable polymer/filler to the curable composition can be used. For example, stabilizers and antioxidants, cure boosters, cure activators, cure accelerators, crosslinkers, waxes, oils, wet electrical stabilizers, and plasticizers can be added. Additional pigmentation can be provided and any other additive for providing or modifying other properties can be used. Other silane crosslinkers, such as vinyltrimethoxysilane or (meth)acryloxytrimethoxysilane, may also be included in the composition, or such silanes may incorporated into the organic polymer backbone by copolymerization.

The proportions of components in the curable composition are not narrowly critical and conventionally are based on weight parts per 100 wt. parts of organic elastomer. On this basis the inorganic filler can be varied from 25 to 200, preferably 50 to 150, wt. parts per 100 wt. parts of elastomer. The coupling composition can be present in an amount ranging from 0.1 to 10, preferably from 0.5 to 3 weight parts per 100 wt. parts of filler and the peroxide or other radical catalyst can be used in amounts of 0.5 to 10 wt. parts, preferably 2 to 5 wt. parts per 100 wt. parts of elastomer.

The curable compositions, except for the catalyst component are conventionally prepared in a BANBURY mixer (Farrel Co.) or any other intensive mixer. Accepted rubber industry compounding techniques may be used. The catalyst, if employed, may be added in the BANBURY mixer or by transferring the resulting compound to a roll mill wherein it is rolled and the peroxide is added and mixed into the compound. Either way, the result is a curable composition which then can be used to coat electrical conductors for the purpose of insulating same after curing. These compositions can also be used for a variety of other applications where low water pickup is desirable, for instance encapsulating of electrical components and other electrical insulation applications, gaskets, seals, pump diaphragms, automotive ignition wires, sulfur cured rubbers, etc. Wire and cable insulations are preferred uses for the filled compositions of the invention.

In order to cure the curable compositions it is only necessary to apply heat above the temperature at which the catalyst becomes activated. Preferably a peroxide is chosen for use having a decomposition temperature in excess of 200° F. (93° C.), preferably in excess of 250° F. (121° C.). In producing insulated wire cable the curable composition, in heated readily deformable condition (but below the decomposition temperature of the catalyst), is applied through an extruder to a conductor to form an insulating coating around the conductor. After extrusion onto the conductor the combined conductor and coating of curable composition is passed into an oven or autoclave where the temperature is raised to a point above the decomposition temperature of the peroxide upon which the curable composition crosslinks to form a tough cured thermoset insulating coating around the conductor.

Other Curable Compositions

These oligomers of formula (1) above, are also useful in coatings or adhesive formulations, as crosslinkers, adhesion promoters, to provide a dual radical/moisture cure mechanism, and/or to provide moisture resistance in the cured coating. The oligomers may be used as reactive diluents, in that they have little volatility, provide little or no contribution to volatile organic compounds (VOCs) and have an adjustable viscosity to match an application, or to dilute another composition to make the entire composition spreadable or sprayable. For such applications oligomers in which $R^3$ comprises an acrylate or methacrylate group are preferred.

The oligomers may be used in masonry waterproofing, paints, corrosion protection systems, and on substrates such as cement, metal, polymers (PVC, PVS, EPDM, PE, PP, ABS, EPR, BR, silicone, polycarbonate, etc.), wood, a paint layer (as a primer) or rubber. Moreover, oligomers may be used in silicate hardcoats.

The oligomers may also be employed in curable compositions comprising ethylenically unsaturated monomers or prepolymers and a free-radical catalyst. Such compositions include UV or EB curable adhesives and coatings, resins and gel-coats formulated from unsaturated polyesters, anaerobically curable adhesives, acrylic engineering adhesives based on polymer-in-monomer syrups, and the like. For such applications the oligomer preferably comprises a free-radically curable group, for instance one or more $R^3$ groups, or vulcanizable group, such as a blocked mercaptan or polysulfide. More preferably the oligomer comprises at least one vinyl, acryl or methacryl group. The oligomer may be employed at levels of from about 0.5 to about 99% of such compositions, preferably about 1 to about 50%, depending on the properties desired to be obtained or modified in the cured formulations.

The adhesive and coating compositions of the invention also will typically include a free-radical catalyst, although this is not always necessary, for instance in formulations designed for EB curing or where the oligomer contains a polysulfide group in the bridge group B or in an $R^4$ group.

The free radical catalyst may be any of the heat activatable catalysts described above or a free radical photoinitiator. Examples of free-radical photoinitiators include benzophenone, acetophenone, chlorinated acetophenone, dialkoxyacetophenones, dialkylhydroxyacetophenones, dialkylhydroxyacetophenone esters, benzoin, benzoin acetate, benzoin alkyl ethers, dimethoxybenzoin, dibenzylketone, benzoylcyclohexanol and other aromatic ketones, acyloxime esters, acylphosphine oxides, acylphosphosphonates, ketosulfides, dibenzoyldisulphides, diphenyldithiocarbonate and diphenyl(2,4,6-trimethylbenzoyl) phosphine oxide. Typically the photoinitiator will be employed in an amount of 0.1 to 10%, preferably 0.5 to 5% by weight of the composition.

The adhesive or coating compositions of the invention may also include any other component conventional for the type of formulation into which the oligomer is incorporated.

The invention is illustrated by the following examples.

EXAMPLES

Oligomers

Example 1 (Comparative Example)

To 1,142.4 g (6 moles) of vinyltriethoxysilane in a two liter three-necked flask was added 05.6 g (0.5 wt. %) of PUROLITE CT-175 sulfonic acid ion exchange resin and 81.0 g (4.5 moles) water. After an initial exotherm to 40° C., the reaction mixture was heated to 80° C. for two hours with stirring. After removing the sulfonic acid ion exchange resin by filtration, 405.5 g of low boiling components containing ethanol (396.5 g, or 8.6 moles) and unreacted vinyltriethoxysilane (about 9 g) was distilled from the flask under reduced pressure to a temperature of 50° C. The yield of clear, colorless vinyl siliconate oligomer of about 1.0 cstk. viscosity was 774.1 g, and contained 11.6 moles of ethoxy groups attached to silicon per kilogram of sample.

Example 2

To 200.0 g of the oligomer of Example 1 (containing approx. 2.3 moles of ethoxy groups) in a 1000 ml. three-necked flask was added 149.0 g (0.8 mole) dodecanol and 0.35 g (0.1 wt. %) of tetraisopropyl titanate catalyst. With stirring the flask contents were heated to 130–140° C., removing 31.2 g of ethanol by distillation. The flask was cooled to 50° C. and 9.4 additional grams of ethanol were distilled under reduced pressure (3 mm Hg). The flask contents were filtered, yielding 305.6 g clear colorless product of 5 cstks. viscosity.

Example 3

To 200.0 g of the oligomer of Example 1 (containing approx. 2.3 moles of ethoxy groups) in a 1000 ml. three-necked flask was added 298.0 g (1.6 moles) dodecanol and 0.5 g (0.1 wt. %) of tetraisopropyl titanate catalyst. With stirring the flask contents were heated to 125–135° C., removing 60.4 g ethanol by distillation. The flask was cooled to 50° C. and 14 additional grams of ethanol were distilled under reduced pressure (3 mm Hg). The flask contents were filtered, yielding 423.7.0 g clear light yellow product of 14 cstks. viscosity.

Example 4

To 200 g oligomer of Example 1 (containing approx. 2.3 moles of ethoxy groups attached to silicon) was added 430 g (2.3 moles) of dodecanol and 0.65 g (0.1 wt. %) of tetraisopropyl titanate. Heating the flask with stirring to 130–140° C. removing 99.1 g (2.2 moles) ethanol by distillation. The viscosity of the resulting colorless product (521.3 g) was 32 cstks.

Example 5

To 148.2 g (1.0 mole) vinyltrimethoxysilane in a 500 ml three-necked flask was added with stirring 29.2 g of 96% formic acid. After stirring for 30 min., the flask was heated to 100° C. distilling 64.4 g of methanol and methyl formate from the reaction mixture and resulting in 110.0 g of oligomeric vinyl siliconate containing 1.7 moles of methoxy groups on silicon. To this oligomer was added 144.6 g (1.1 moles) of octanol and 0.11 g tetraisopropyl titanate. The flask was heated to 125° C. distilling 32.6 g methanol from the flask. The resulting 214.5 g product was clear and colorless.

Compositions

The compositions described below, were each prepared in the following manner. The compositions were prepared in a "B" BANBURY® mixer, using full cooling water. Add EPDM polymer, ram down mix (RDM) 30 secs. at 116 RPM. Add clay and oligomer, RDM 30 secs. Add rest of ingredients, except for the peroxide, RDM 30 secs. Dust down, RDM 20 secs. Dust down, RDM at 155 RPM until 149° C. is reached. Dump the mixer contents and sheet off on a 5×30 cm roll mill using a roll temperature of 80–85° C.

The resulting products were catalyzed by adding the peroxide on the roll mill at 80–85° C. and then cooled to room temperature. Test plaques were made from each rubber compound and cured for 25 minutes at 171° C. The test plaques for each compound were tested for mechanical properties and electrical properties as set forth in Table 1.

The formulations used Table 1 were prepared by incorporating the oligomers shown in Table 1 into a base formulation as follows, where quantities are given in parts by weight:

100 NORDEL 2722P EPDM (DuPont)
1.5 AGERITE Resin D antioxidant (Vanderbilt)
60 Whitex clay (Engelhard)
5 zinc oxide (Zinc Corp.)
5 paraffin wax (International Wax)
5 ERD 90 red lead dispersion (Rhein-Chemie)
2.6 DICUP R peroxide (Hercules)

In Table 1, A-1751 is SILQUEST® A-1751 a commercial oligomer sold by Crompton Corporation as a coupling agent for curable filled elastomer formulations for wire and cable insulation applications, and provided as a further comparative example, together with the "None" and "Ex 1" entries.

TABLE 1

| Oligomer | None | A-1751 | Ex 5 | | Ex 1 | Ex 2 | Ex 3 | Ex 4 |
|---|---|---|---|---|---|---|---|---|
| Physical Properties, cured 20 minutes @ 171° C. | | | | | | | | |
| Hardness, Shore A | 84 | 84 | 85 | | 86 | 86 | 86 | 86 |
| Elongation, % | 520 | 420 | 390 | | 290 | 340 | 380 | 410 |
| 100% Modulus, psi. | 620 | 850 | 800 | | 860 | 800 | 780 | 770 |
| 200% Modulus, psi. | 750 | 1210 | 1360 | | 1490 | 1320 | 1270 | 1190 |
| 300% Modulus, psi. | 870 | 1430 | 1700 | | 1790 | 1640 | 1550 | 1440 |
| Tensile, psi. | 2190 | 1750 | 1910 | | 1810 | 1740 | 1710 | 1660 |
| Specific Inductive Capacity @ 60 HZ | | | | | | | | |
| As cured | 2.48 | 2.26 | 2.49 | As cured | 2.58 | 2.45 | 2.55 | 2.38 |
| 3 days in 90° C. water | 3.09 | 2.59 | 2.45 | | | | | |
| 14 days in 90° C. water | 3.27 | 2.63 | 2.42 | 17 Days in 90° C. water | 2.58 | 2.43 | 2.57 | 2.42 |
| 28 days in 90° C. water | 3.23 | 2.64 | 2.46 | 34 Days in 90° C. water | 2.58 | 2.29 | 2.58 | 2.44 |
| 55 days in 90° C. water | 3.16 | 2.65 | 2.44 | 48 Days in 90° C. water | 2.56 | 2.43 | 2.58 | 2.43 |
| 83 days in 90° C. water | 3.09 | 2.65 | 2.46 | 92 Days in 90° C. water | 3.00 | 2.47 | 2.60 | 2.45 |
| Power Factor @ 60 HZ | | | | | | | | |
| As cured | 0.0022 | 0.0015 | 0.0013 | As cured | 0.0011 | 0.0013 | 0.0013 | 0.0013 |
| 3 days in 90° C. water | 0.045 | 0.0024 | 0.0017 | | | | | |
| 14 days in 90° C. water | 0.045 | 0.0024 | 0.0015 | 17 Days in 90° C. water | 0.0017 | 0.0022 | 0.0032 | 0.0032 |
| 28 days in 90° C. water | 0.050 | 0.0028 | 0.0018 | 34 Days in 90° C. water | 0.0026 | 0.0026 | 0.0034 | 0.0040 |
| 55 days in 90° C. water | 0.053 | 0.0033 | 0.0020 | 48 Days in 90° C. water | 0.0023 | 0.0021 | 0.0029 | 0.0036 |
| 83 days in 90° C. water | 0.051 | 0.0051 | 0.0025 | 92 Days in 90° C. water | 0.0022 | 0.0025 | 0.0032 | 0.0041 |

From the data in the table it can be seen that the invention formulations based on the oligomers of Examples 2–5 provide a better balance of long term stability in the specific inductive capacity and power factor properties relative to the comparative formulations. The formulations of Examples 2–4 had a lower odor than those of Example 5, making the dodecyloxy oligomers of the invention preferable for commercialization.

The above Examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is:

1. An oligomer of the formula:

$$[R_3SiO_{1/2}]_m[O_{1/2}Si(R_2)O_{1/2}]_n[SiO_{3/2}R]_o[SiO_{4/2}]_p \qquad (I)$$

wherein
each r is selected individually from the group consisting of $R_1$, —$OR^2$ and —$OR^3$; each $R_1$ is independently a substituted or unsubstituted hydrocarbon group; each $R^2$ is a $C_1$–$C_6$ alkyl group or an acyl group; and each $R^3$ is a independently an alkyl or alkenyl group having at least 8 carbon atoms;

with the provisos that if $R^3$ is alkenyl, there is no unsaturation within two carbons adjacent to the oxygen atom of the —$OR^3$ group; at least one r group is —$OR^3$; at least one half of all R groups are —$OR^2$ or —$OR^3$; m=2 to 20; n=0 to 50; o=0 to 20; and p=0 to 10; and that with respect to the individual terminal or linear units of the oligomer, if one R is $R^1$, the other R groups on such unit are —$OR^2$ or —$OR^3$.

2. The oligomer of claim 1 wherein m is 2 to 10, n is 0 to 20, o is 0 to 10 and p is 0 to 5.

3. The oligomer of claim 2 wherein m is 2–4, n is 1–15, o is 0–2 and p is 0–1.

4. The oligomer of claim 1 wherein $R^1$ is an unsubstituted hydrocarbon group.

5. The oligomer of claim 4 wherein $R^1$ is methyl.

6. The oligomer of claim 1 wherein at least one $R^1$ group comprises a vinyl, acryloxy, or methacryloxy group.

7. The oligomer of claim 1 wherein $R^1$ is an organic radical linked to a Si atom of the oligomer by an Si—C bond and having at least one ether, ester, carbamate, isocyanurate, thioether, polysulfide, blocked mercaptan, amide, cyano, epoxy or oximato group thereon.

8. The oligomer of claim 1 wherein $R^2$ is methyl or ethyl.

9. The oligomer of claim 8 wherein $R^3$ is octyl, dodecyl or a mixture thereof.

10. The oligomer of claim 1 wherein the $R^3$ groups are $C_{10}$–$C_{16}$ alkyl groups.

11. The oligomer as in claim 1 wherein $R^3$ is dodecyl.

12. A hydrolyzate of an oligomer as in claim 1.

13. A composition comprising:

A) an oligomer of the formula:

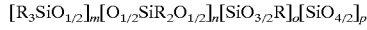

wherein each R is selected individually from the group consisting of $R^1$, —$OR^2$ and —$OR^3$; each $R^1$ is independently a substituted or unsubstituted hydrocarbon group; each $R^2$ is a $C_1$–$C_6$ alkyl group or an acyl group; and each $R^3$ is independently an alkyl or alkenyl group having at least 8 carbon atoms;

with the provisos that if $R^3$ is alkenyl, there is no unsaturation within two carbons adjacent to the oxygen atom of the —$OR^3$ group; at least one R group is —$OR^3$; at least one half of all R groups are —$OR^2$ or —$OR^3$; m=2 to 20; n=0 to 50; o=0 to 20; and p=0 to 10; or a hydrolyzate of said oligomer; and B) at least one free radically curable monomer, polymer, or copolymer.

14. The composition of claim 13 wherein said polymer is a member of the group consisting of natural rubber, styrene-butadiene rubber, ethylene-propylene copolymers, polyethylene, ethylene-vinyl acetate copolymers, ethylene-propylene terpolymer rubbers in which the third monomeric component is ethylidene norbornene or 1,4-hexadiene, urethane rubbers, polyisobutadiene rubbers and mixtures thereof.

15. The composition of claim 13 further comprising a free-radical curing catalyst selected from the group consisting of organic peroxides, azonitrile compounds, sulfur, metal drier compounds, and free-radical photoinitiators, and mixtures thereof.

16. The composition of claim 13 further comprising an inorganic filler.

17. The composition of claim 16 wherein the inorganic filler is selected from the group consisting of asbestos, ground glass, kaolin, and other clay minerals, silica, calcium silicate, calcium carbonate (whiting), magnesium oxide, barium carbonate, barium sulfate (barytes), metal fibers and powders, glass fibers, refractory fibers, titanium dioxide, mica, talc chopped glass, alumina, aluminatrihydrate, quartz, calcium silicate, inorganic coloring pigments and mixtures thereof.

18. A filler treated with an oligomer of claim 1 or a hydrolyzate thereof.

* * * * *